US011595269B1

(12) United States Patent
Ghosh et al.

(10) Patent No.: US 11,595,269 B1
(45) Date of Patent: Feb. 28, 2023

(54) IDENTIFYING UPGRADES TO AN EDGE NETWORK BY ARTIFICIAL INTELLIGENCE

(71) Applicant: International Business Machines Corporation, Armonk, NY (US)

(72) Inventors: Partho Ghosh, Kolkata (IN); Sarbajit K. Rakshit, Kolkata (IN); Saswata Banerjee, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 17/472,924

(22) Filed: Sep. 13, 2021

(51) Int. Cl.
| | |
|---|---|
| *G06F 15/173* | (2006.01) |
| *H04L 41/16* | (2022.01) |
| *G06N 20/00* | (2019.01) |
| *H04L 41/14* | (2022.01) |
| *H04L 41/5003* | (2022.01) |
| *G16Y 10/75* | (2020.01) |
| *H04L 43/08* | (2022.01) |

(52) U.S. Cl.
CPC ............ *H04L 41/16* (2013.01); *G06N 20/00* (2019.01); *G16Y 10/75* (2020.01); *H04L 41/14* (2013.01); *H04L 41/5003* (2013.01); *H04L 43/08* (2013.01)

(58) Field of Classification Search
None
See application file for complete search history.

(56) References Cited

U.S. PATENT DOCUMENTS

| | | | | |
|---|---|---|---|---|
| 9,940,125 | B1* | 4/2018 | Espy ................... | G06F 9/5027 |
| 10,748,161 | B1* | 8/2020 | Norbeck, Jr. ........... | H04L 41/22 |
| 11,348,166 | B2* | 5/2022 | Singh ................. | G06Q 10/0833 |
| 2014/0068348 | A1* | 3/2014 | Mondal ................ | G06F 11/079 |
| | | | | 714/45 |
| 2014/0195297 | A1* | 7/2014 | Abuelsaad ......... | G06Q 10/0635 |
| | | | | 705/7.28 |
| 2016/0234079 | A1* | 8/2016 | Lee ..................... | H04L 41/5012 |
| 2016/0274893 | A1* | 9/2016 | Thomas ................. | G06F 8/71 |
| 2016/0337426 | A1* | 11/2016 | Shribman ............ | H04L 65/612 |
| 2020/0013107 | A1 | 1/2020 | Kusano | |

(Continued)

OTHER PUBLICATIONS

"Method and System for Providing Electronic Product Shopping Assistance from Home Network Devices", ip.com, IP.com No. IPCOM000258619D, Published Date: May 29, 2019, 6 pages.

(Continued)

*Primary Examiner* — Phuoc H Nguyen
(74) *Attorney, Agent, or Firm* — Daniel M. Yeates (57) ABSTRACT

A computer-implemented method upgrades an edge network based on analysis by a learning model. The method includes identifying, in a network, a plurality of devices, where each device in the network is configured to provide data on at least one other device in the network. The method also includes determining capabilities of each device of the plurality of devices. The method further includes monitoring, for each device, capacity information and tasks performed during operation of the network. The method includes analyzing, based on the monitoring, each use of each device. The method also includes recommending, in response to the analyzing and by a learning model, a first upgrade to the network. The method further includes implementing the first upgrade.

19 Claims, 6 Drawing Sheets

(56) References Cited

U.S. PATENT DOCUMENTS

| | | | |
|---|---|---|---|
| 2020/0074522 A1 | 3/2020 | Balasubramanian et al. | |
| 2020/0389357 A1 | 12/2020 | Hu et al. | |
| 2021/0004409 A1 | 1/2021 | Duran et al. | |
| 2021/0157312 A1* | 5/2021 | Cella | G05B 23/0289 |
| 2021/0266358 A1* | 8/2021 | Cady | H04L 67/1097 |
| 2021/0398187 A1* | 12/2021 | Tennur Narayanan | G06Q 30/0631 |
| 2022/0092505 A1* | 3/2022 | Elgethun | G06Q 50/163 |

OTHER PUBLICATIONS

"Method for Automatically Suggesting an IoT Device Upgrade", ip.com, IP.com No. IPCOM000264534D, Published Date: Jan. 4, 2021, 3 pages.

"Edge Computing in the Context of Voice Assistants and Beyond", Onix-Systems, Nov. 2018, 9 pages. https://onix-systems.medium.com/edge-computing-in-the-context-of-voice-assistants-and-beyond-2e8bf26d9266.

Young, "Dedicated Audio Processors at the Edge are the Future. Here are the Reasons Why", Voicebot.ai, Jun. 2019, 8 pages. https://voicebot.ai/2019/06/01/dedicated-audio-processors-at-the-edge-are-the-future-here-are-the-reasons-why/.

Dechouniotis et al., "Edge Computing Resource Allocation for Dynamic Networks: The DRUID-NET Vision and Perspective", Sensors (Basel), Apr. 2020, 18 pages. https://www.ncbi.nlm.nih.gov/pmc/articles/PMC7218846/.

Li et al., "Method of Resource Estimation Based on QoS in Edge Computing", Hindawi, Wireless Communications and Mobile Computing, vol. 2018, Article ID 7308913, Jan. 2018, 10 pages. https://www.researchgate.net/publication/322682027_Method_of_Resource_Estimation_Based_on_QoS_in_Edge_Computing.

Mell et al., "The NIST Definition of Cloud Computing", Recommendations of the National Institute of Standards and Technology, Special Publication 800-145, Sep. 2011, 7 pages.

* cited by examiner

IDENTIFYING UPGRADES TO AN EDGE NETWORK BY ARTIFICIAL INTELLIGENCE

BACKGROUND

The present disclosure relates to edge computing, and, more specifically, to optimizing edge computing system based on analysis by artificial intelligence.

Modern computing networks can include a wide variety of sensors that collect and attempt to analyze large amounts of data in real time. This can be generally known as an Internet of Things (IoT). The data is gathered by various sensors, sent to a processor, analyzed, and then returned to the source to provide information and/or perform a function within the network.

SUMMARY

Disclosed is a computer-implemented method to upgrade an edge network based on analysis by a learning model. The method includes identifying, in a first network, a plurality of devices, where each device in the network is configured to provide data of at least one other device in the network. The method also includes determining capabilities of each device of the plurality of devices. The method further includes monitoring, for each device, capacity information and tasks performed during operation of the network. The method includes analyzing, based on the monitoring, each use of each device. The method also includes recommending, in response to the analyzing and by a learning model, a first upgrade to the network. The method further includes implementing the first upgrade. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
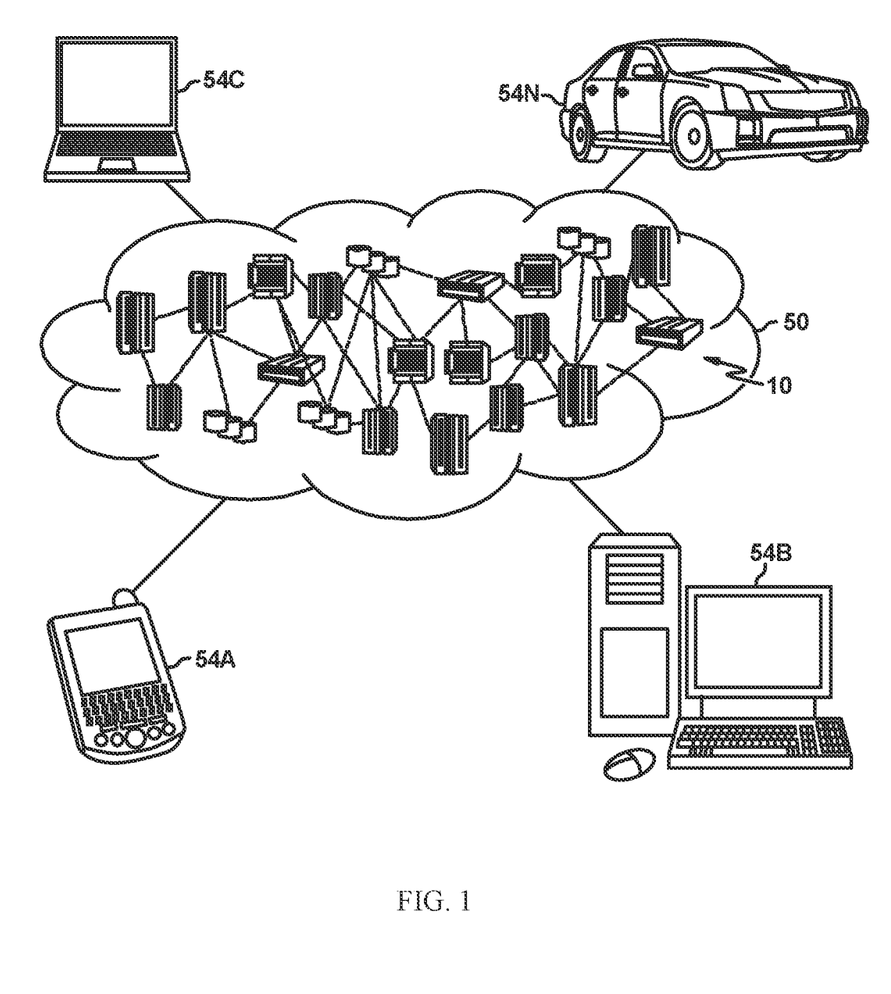
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
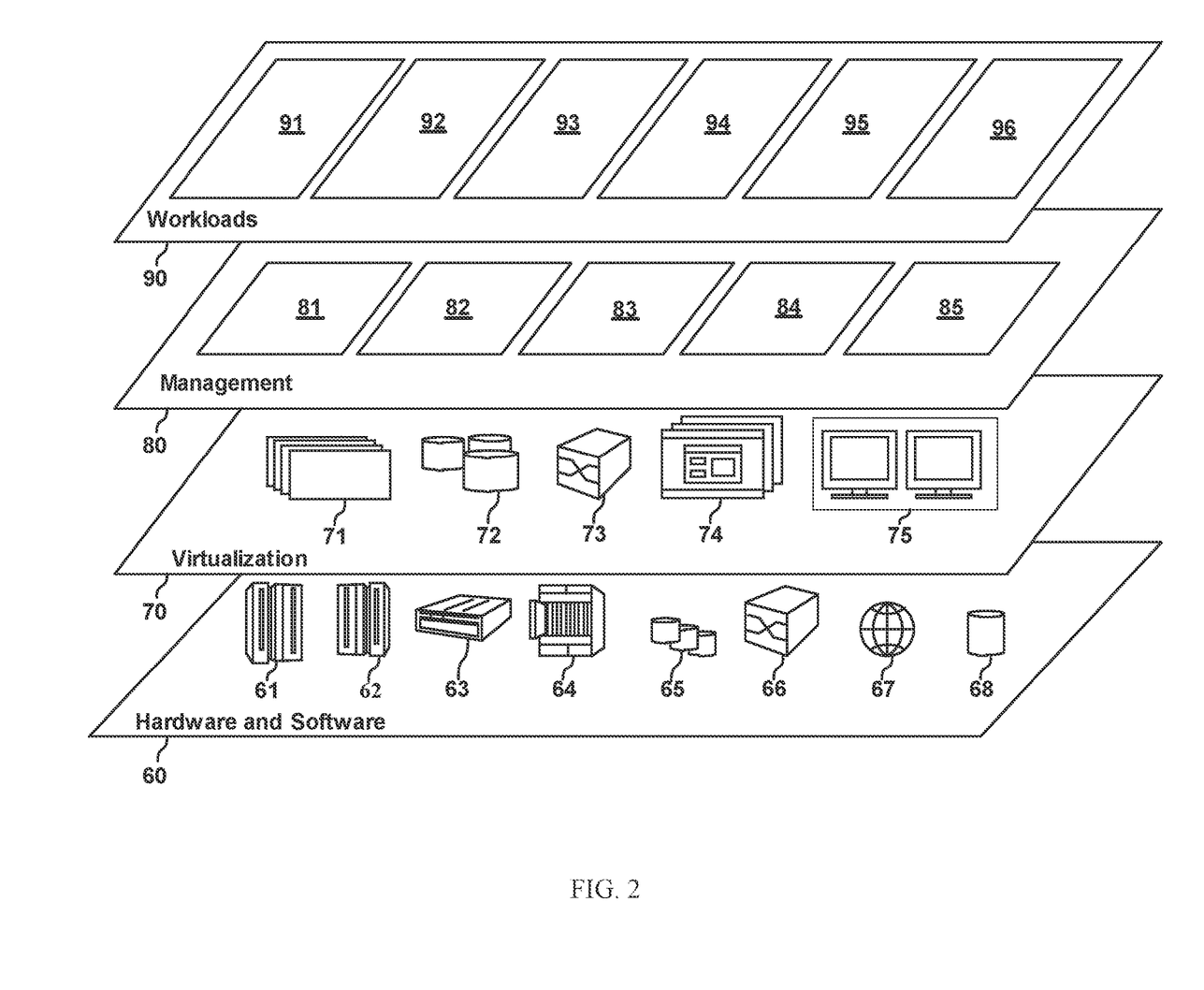
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and recommending edge network upgrades 96.

Data Processing System in General

Figure 3:
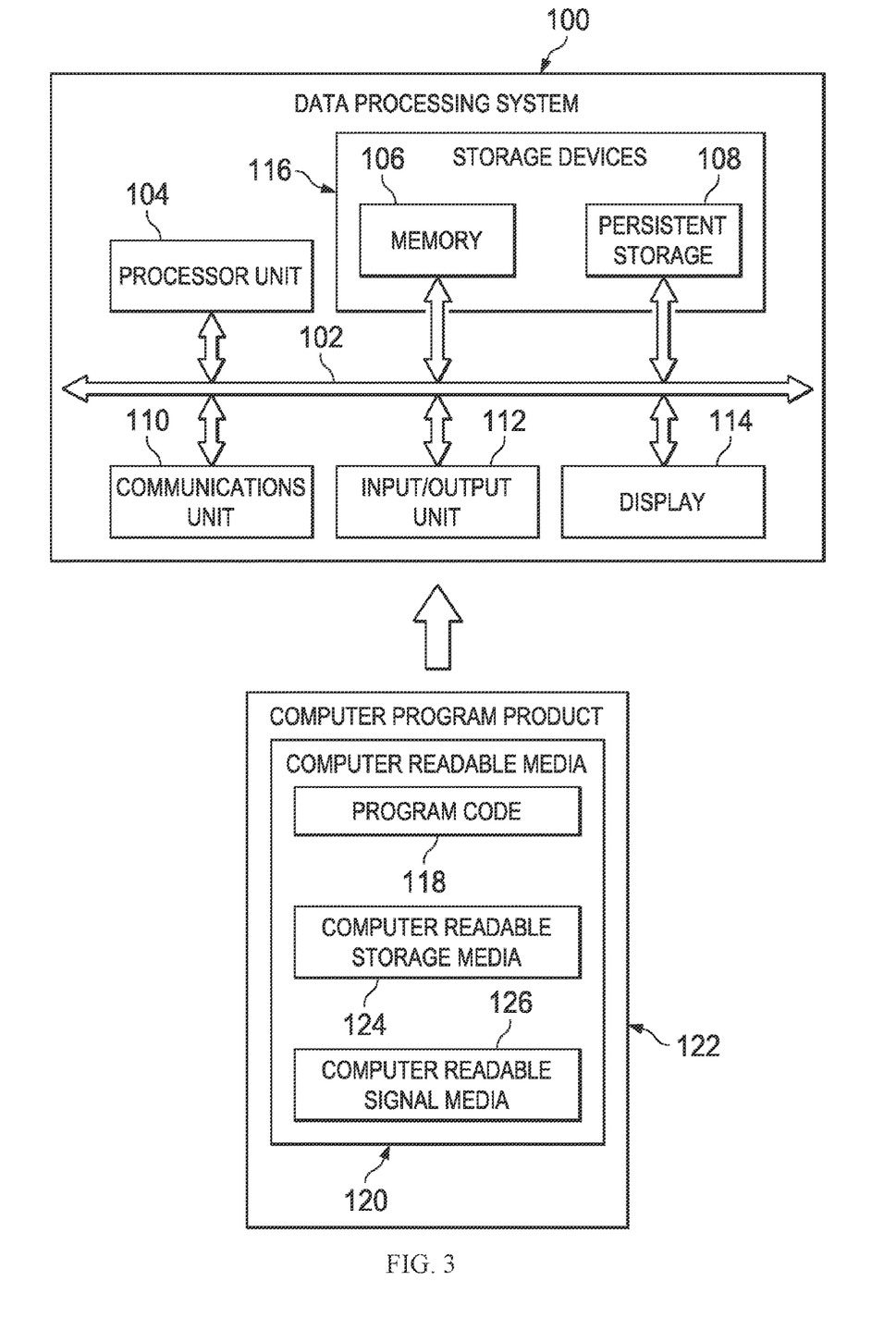
FIG. 3 is a block diagram of a DPS according to one or more embodiments disclosed herein.

FIG. 3 is a block diagram of an example data processing system (DPS) according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an Input/Output (I/O) unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

Modern computing networks can include a wide variety of sensors that collect and attempt to analyze large amounts of data in real time. This is generally known as an Internet of Things (IoT). The data is gathered by various sensors. In some embodiments, the IoT network can be configured to perform one or more functions and/or provide information to a user in the vicinity of the IoT in response to the collected data. Before the response can be given/performed, the data must be analyzed to determine which result(s)/action(s) to provide to the user. Because the IoT sensors are continuously gathering and/or analyzing data, they can require a large, or at least a requisite, amount of processing memory, processing time, and data storage. There may be additional factors that need to be present to make the IoT network operate as intended. In some instances, the IoT network can gather more data and needs help from a different device to fully utilize the gathered data.

In some embodiments, data that is gathered by an IoT device (or a different sensor) is sent to a remote data center to be processed and/or stored. The effectiveness and efficiency of the IoT networks can be limited by bandwidth (sending and receiving the data from the remote data center), processing availability, storage capacity, and/or other similar factors.

In some embodiments, edge computing (or an edge network) is used to increase the efficiency of the IoT network and/or other smart computer networks. An edge network is any network where the processing is performed at the edge of the network, or at least closer the source of the data. The edge of the network can be any processing that is performed away from the data center. In some embodiments, the edge of the network can be at the same vicinity (e.g., in the same home, building, factory, park, etc.) of the data generation point. This can greatly reduce bandwidth required to effectively use an IoT or other smart network as designed.

For purposes of this application, an IoT device can be any device with one or more sensors that is connected to a network (e.g., IoT network). The IoT device can have computing resources capable of collecting data, sending and/or receiving data across the network, performing one or more functions, and storing data generated by the IoT device. However, the IoT device generally will not process data gathered by a different IoT device. An edge device can be any computing device connected to the network, configured to process data collected in the network. Said differently, any computing device connected to the network and in a relative vicinity of data generation (e.g., IoT device) that stores and/or processes data from a different device can be an edge device. In some embodiments, a single device can be an IoT device and an edge device or a combined device. A combined device can have one or more sensors and process data from a different IoT device connected to the network. Various networks can have any number of IoT devices, edge devices, and/or combined devices.

With a large number of devices and constantly changing applications and available products, it can be difficult to ensure proper configuration a smart network (e.g., IoT network, edge network, etc.). This can include knowing when to upgrade or add devices, and/or increase network capacity such as computing power, storage space, and bandwidth need. When the network is not configured correctly, this can reduce the efficiency and/or the effectiveness of the smart network.

Embodiments of the present disclosure can analyze one or more networks and make recommendations to increase the efficiency and/or utility of a network (e.g., IoT network, edge network, etc.). In some embodiments, the recommendations can be based on current and/or predicted future needs of Quality of Service (QoS), size, number of devices, and/or any other specifications. The recommendation can include upgrading one or more devices, adding one or more devices, and/or upgrading to an edge network.

In some embodiments, the recommendations are generated by a network manager. The network manager can analyze current uses, historical uses, and efficiency changes based on past devices to generate the recommendations. In some embodiments, the network manager can use one or more learning models (machine learning models) to generate the recommendations. In some embodiments, the network manager can analyze data from one or more edge networks to determine where efficiency and/or effectiveness gains are available.

In some embodiments, the recommendations are based on historical data and/or monitoring of the network. The network manager can record which devices are performing which functions as part of the network. The functions and/or tasks can be associated with one or more applications and/or programs. The applications can be configured to accomplish any number of tasks. In some embodiments, the actions performed by edge devices can include voice assistance, material movement, route calculation, machinery efficiency calculations, and the like. All the recorded data can be collected and stored in a historical corpus.

In some embodiments, the network manager can ingest information about new products and/or available services. The new information can be retrieved from the Internet, trade publications, advertisements and/or other similar information repositories. The network manager can use natural language processing (NLP) to determine the configuration, and other specifications of the new products. In some embodiments, the new data can be the basis for the recommendations.

In some embodiments, the network manager can generate a digital twin of the network to perform simulations of recommended systems. The digital twins can be used to run one or more simulations. In some embodiments, the simulation data can be added to the training data. In some embodiments, the simulation data can be used to identify QoS, Level of Service (LoS), gaps in efficiency, and/or other factors that can affect the overall efficiency of an edge network. The results of the simulation data can be used as a factor in various recommendations.

The aforementioned advantages are example advantages, and embodiments exist that can contain all, some, or none of the aforementioned advantages while remaining within the spirit and scope of the present disclosure.

Figure 4:
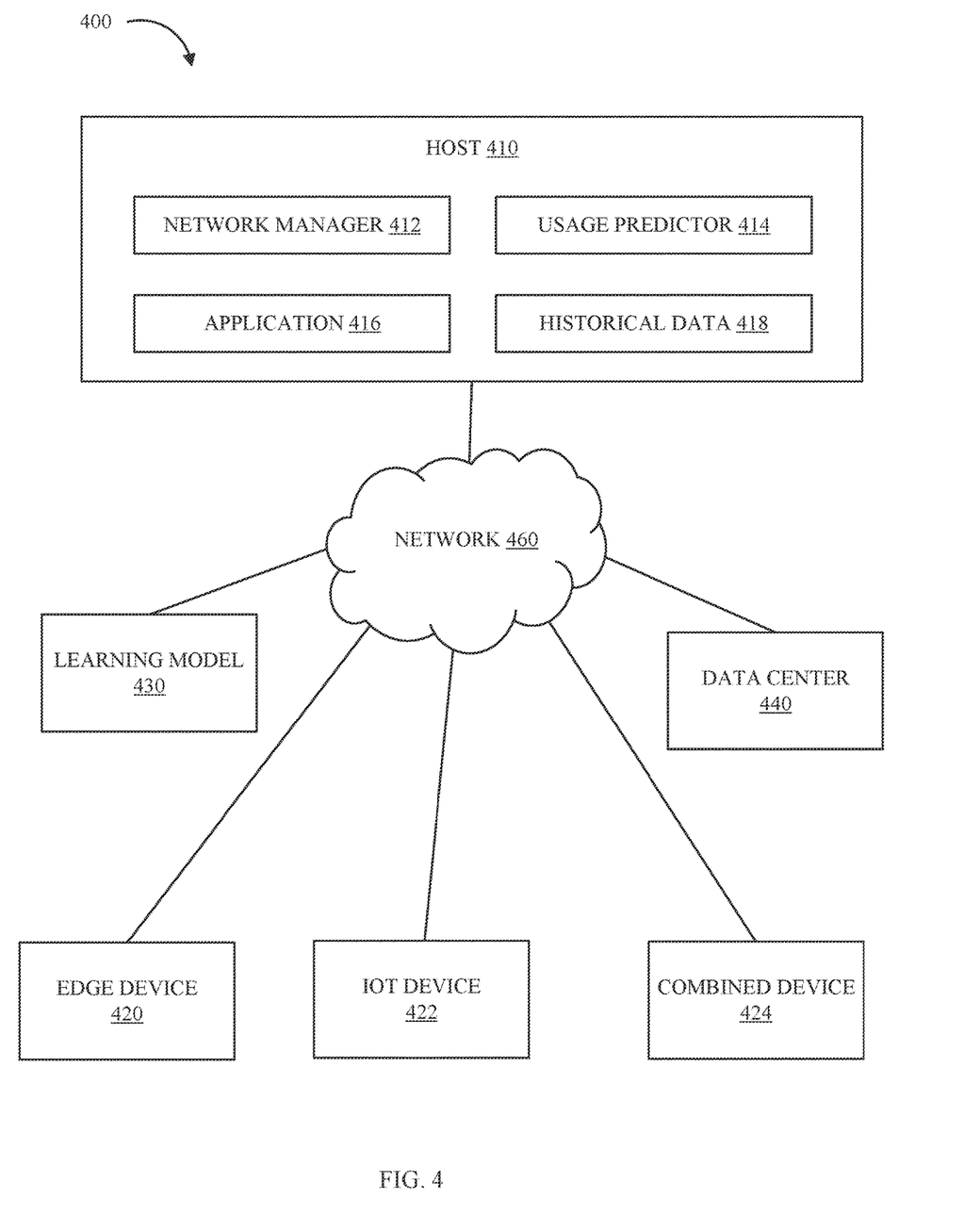
FIG. 4 illustrates a functional diagram of a computing environment suitable for operation of a network manager in accordance with some embodiments of the present disclosure.

Referring now to various embodiments of the disclosure in more detail, FIG. 4 is a representation of a computing environment 400, that is capable of running a network manager in accordance with one or more embodiments of the present disclosure. Many modifications to the depicted environment may be made by those skilled in the art without departing from the scope of the disclosure.

Computing environment 400 includes host 410, edge device 420, IoT device 422, combined device 424, data center 440, learning model 450, and network 460. In some embodiments, each of host 410, edge device 420, IoT device 422, combined device 424, and data center 440 may include a computer system, such as the data processing system 100 of FIG. 3.

Host 410 can be a standalone computing device, a management server, a web server, a mobile computing device, or any other electronic device or computing system capable of receiving, sending, and processing data. In other embodiments, host 410 can represent a server computing system utilizing multiple computers as a server system, such as in a cloud computing environment (e.g., cloud computing environment 50). In some embodiments, host 410 includes network manager 412, usage predictor 414, application 416, and historical data 418. In some embodiments, host 410 can be integrated into and/or combined with an edge device.

Network manager 412 can be any configuration of hardware and/or software configured to manage a network (e.g., network 460). In some embodiments, the network can include one or more of each of an IoT device (e.g., IoT device 422), an edge device (e.g., edge device 420) and/or a combined a device. In some embodiments, network manager 412 coordinates actions between the various devices connected an IoT/edge network. In some embodiments, network manager 412 monitors and/or records data related to operation of the edge network. Network manager 412 can monitor actions taken by any of the connected devices. The actions can include data storage, data processing, data input, data/action output, efficiencies, down time, and the like. The monitored data can be stored in historical data 418. In various embodiments, network manager 412 can include and/or be incorporated into one or more of usage predictor 414, application 416, and historical data 418.

Usage predictor 414 can be any combination of hardware and/or software configured to generate recommendations about the IoT/edge network. In some embodiments, usage predictor 414 can use learning model 430 to generate the recommendations. In some embodiments, the recommendations can be based on historical data 418, new product information, current usage and efficiency of the network, previous usage and efficiency of the network and the like. In some embodiments, the recommendations are based on a simulation run with digital twins of the connected devices. In some embodiments, the simulation can include potential replacement devices. The potential replacement devices can be based on analyzing new product information. The specification for the potential replacement devices can be input into the simulation. The input can be manual by a user. In some embodiments, the input is based on NLP of the product information. The specification can include bandwidths, processing speed, storage space, speed data, and other similar technical data.

In some embodiments, the predictions can be based on predicted future uses and/or predicted future required capacity. In some embodiments, usage predictor 414 can analyze QoS. Usage predictor 414 can output a QoS score. The QoS score can represent the effectiveness/quality of the network, or a component/task within the network.

In some embodiments, the prediction can include changing the network from an IoT network to an edge network. For example, if usage predictor determines that remote bandwidth (e.g., sending data to and from data center 440) is a limiting factor in the efficiency, then adding an edge device or a combined device can reduce and/or eliminate the bandwidth limitation. An alternate recommendation for this scenario can be to upgrade a modem that has a higher throughput.

In some embodiments, the recommendation can include adding one or more devices. The recommended device can be an edge device, an IoT device, and/or a combined device. In some embodiments, the recommendation can include upgrading a device. In some embodiments, the recommendation can include reconfiguring the network.

Application 416 can be any combination of hardware and/or software configured to carry out a function on a computing device (e.g., host 410). In some embodiments, application 416 is a web application. In some embodiments, application 416 can be configured to perform one or more functions on an edge/IoT network. In some embodiments, application 416 can include and/or work with network manager 412 to send and/or receive data from various devices managed by network manager 412. In some embodiments, each component within computing environment 400 (e.g., host 410, edge device 420, etc.) can include one or more applications, where each application can be configured to complete a different task and can be managed by network manager 412.

Historical data 418 can be any combination of hardware and/or software configured to store historical data related to one or more accounts/users that use network manager 412. In some embodiments, network manager 412 includes network simulation data. Historical data 418 can be analyzed by learning model 430. In some embodiments, historical data 418 is updated after each simulation, upgrade, and/or at the end of a predefined period of time (e.g., each day, each week, etc.). In some embodiments, historical data 418 can be used as training data for learning model 430.

IoT device 422 can be any device connected to a network that includes a sensor. In some embodiments, the sensor can be configured to gather data. In some embodiments, IoT device 422 can include two or more different sensors. The sensors can measure temperature, lighting, moisture, noise, movement, and the like. The sensors can be fixed (e.g., mounted on a ceiling or wall), or movable (e.g., attached to a person). In some embodiments, IoT device 422 can send captured data and send the data to another device in the network. In some embodiments, IoT device 422 can perform an action/function (e.g., turn on a light, etc.). Generally, the processing and storage capability of the IoT device is limited to what is required to operate the single IoT device. The additional complex processing, and/or combinations of data from two or more devices can be performed by host 410 edge device 420, and/or data center 440. In some embodiments, computing environment 400 includes two or more IoT devices 422.

Edge device 420 can be any combination of hardware and/or software configured to process data. In some embodiments, the data is collected by IoT device 422 and/or combined device 434. In some embodiments, edge device 420 can provide processing capability closer to the point of data generation, thereby eliminating the need and resource usage to send the data to data center 440. In some embodiments, edge device 420 can be in communication with network manager 412. In some embodiments, computing environment 400 includes two or more edge devices 420.

Combined device 424 can be any combination of hardware and/or software that contains the functionality of IoT device 422 and edge device 420. For example, a combined device can include at least one sensor, and have the capability to process data received from a second sensor on a different device.

Learning model 430 can be any combination of hardware and/or software configured to generate a recommendation to upgrade an IoT/edge network. In some embodiments, learning model 430 can include two or more separate models. In some embodiments, learning model can calculate efficiencies and//or QoS of a network or part of a network. Learning model 430 can analyze several configurations of devices within a network and the network configuration as a whole to determine highest efficiencies.

In some embodiments, learning model 430 can recommend one or more of: upgrading a network to an edge network, replacing a network device, adding one or more new devices to the network, and altering at least one configuration. In some embodiments, learning model 430 can predict when usage of the network will increase. This can be based on historical trends, product releases, upgrade schedules, and the like.

In some embodiments, learning model 430 can be trained based on historical data 418. In some embodiments, learning model 430 can be updated as additional data is added to historical data 418. Historical data 418 can be collected from monitoring the operation of various IoT and/or edge networks. Each time a network is changed, new data can be collected and added to the historical data 418. In some embodiments, historical data 418 includes simulation data. The simulations can alter/add various components in the network to see how operation of the network changes. Learning model 430 can use the output of the simulations to further fine tune the configurations of both the devices in the network and the overall network.

In some embodiments, learning model 430 may execute machine learning on data from the environment using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR). In some embodiments, the BBSH may execute machine learning using one or more of the following example techniques: principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naive Bayes, averaged one-dependence estimators (AODE), Bayesian network (BN), classification and regression tree (CART), chi-squared automatic interaction detection (CHAID), region-based convolution neural networks (RCNN), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Data center 440 can be any combination of hardware and/or software configured to process data generated/obtained from a network. In some embodiments, data center 440 is remotely located from the source of the data. "Remotely" can mean a different geographic location (e.g., different building, different state, different county, etc.). In some embodiments, data center 440 can include enough resources to perform complex and resource intensive processing applications.

Network 460 can be, for example, a telecommunications network, a local area network (LAN), a wide area network (WAN), such as the Internet, or a combination of the three, and can include wired, wireless, or fiber optic connections. Network 460 may include one or more wired and/or wireless networks that are capable of receiving and transmitting data, voice, and/or video signals, including multimedia signals that include voice, data, and video information. In general, network 460 may be any combination of connections and protocols that will support communications between and among host 410, edge device 420, IoT device 422, combined device 424, data center 440, and other computing devices (not shown) within computing environment 400.

In some embodiments, network 460 can include two or more separate networks. The two or more networks can be communicatively connected. In some embodiments, one of the two or more networks can be an edge/IoT network. The edge/IoT network can be a local network that connects each of edge device 420, IoT device 422, and/or combined device 424. The second network can connect the first network to a wide area network such as the Internet (or a corporation intranet). The wide area network can include the connections to data center 440, and learning model 430, as an example, where host 410 can be a link between the first network and the second network while being connected to both.

Figure 5:
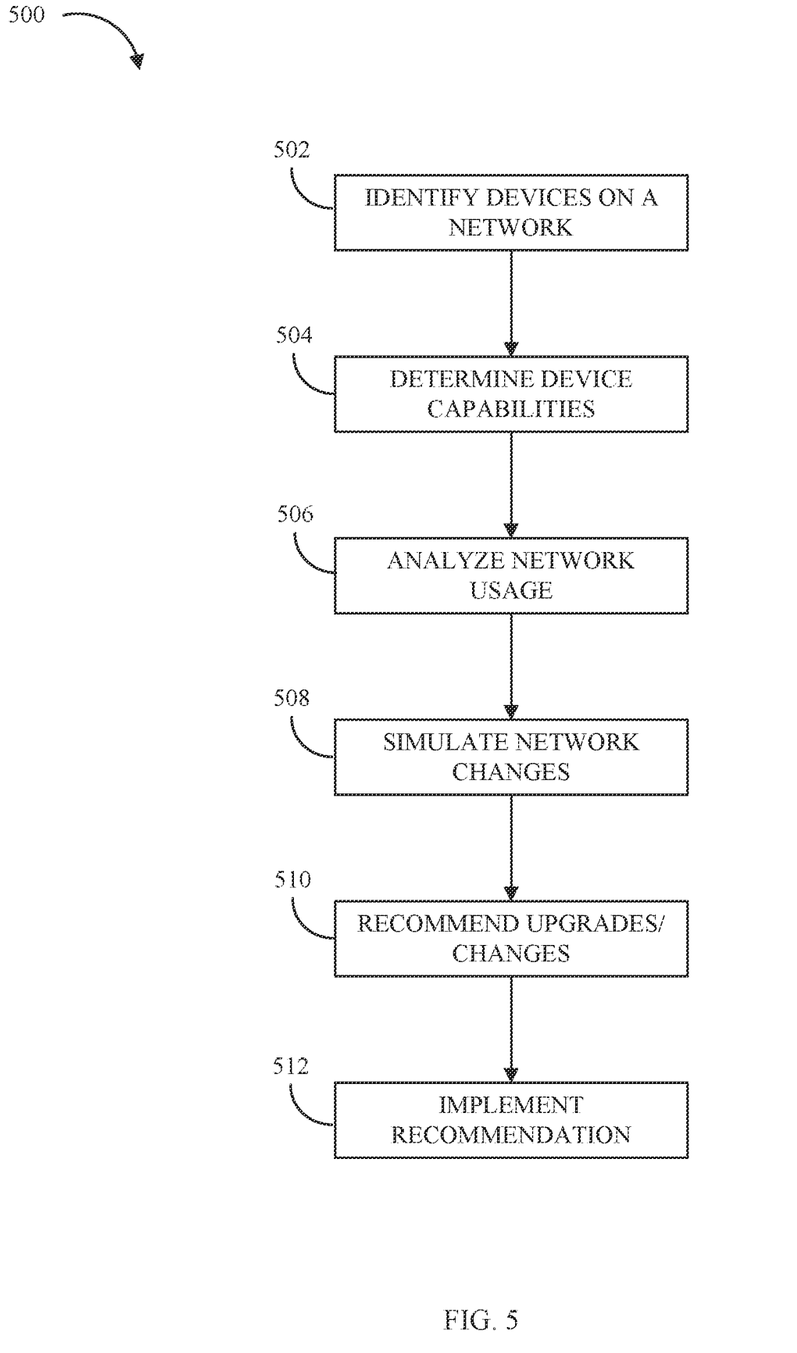
FIG. 5 illustrates a flow chart of an example method to recommend upgrades to an edge network, in accordance with some embodiments of the present disclosure.
Figure 6:
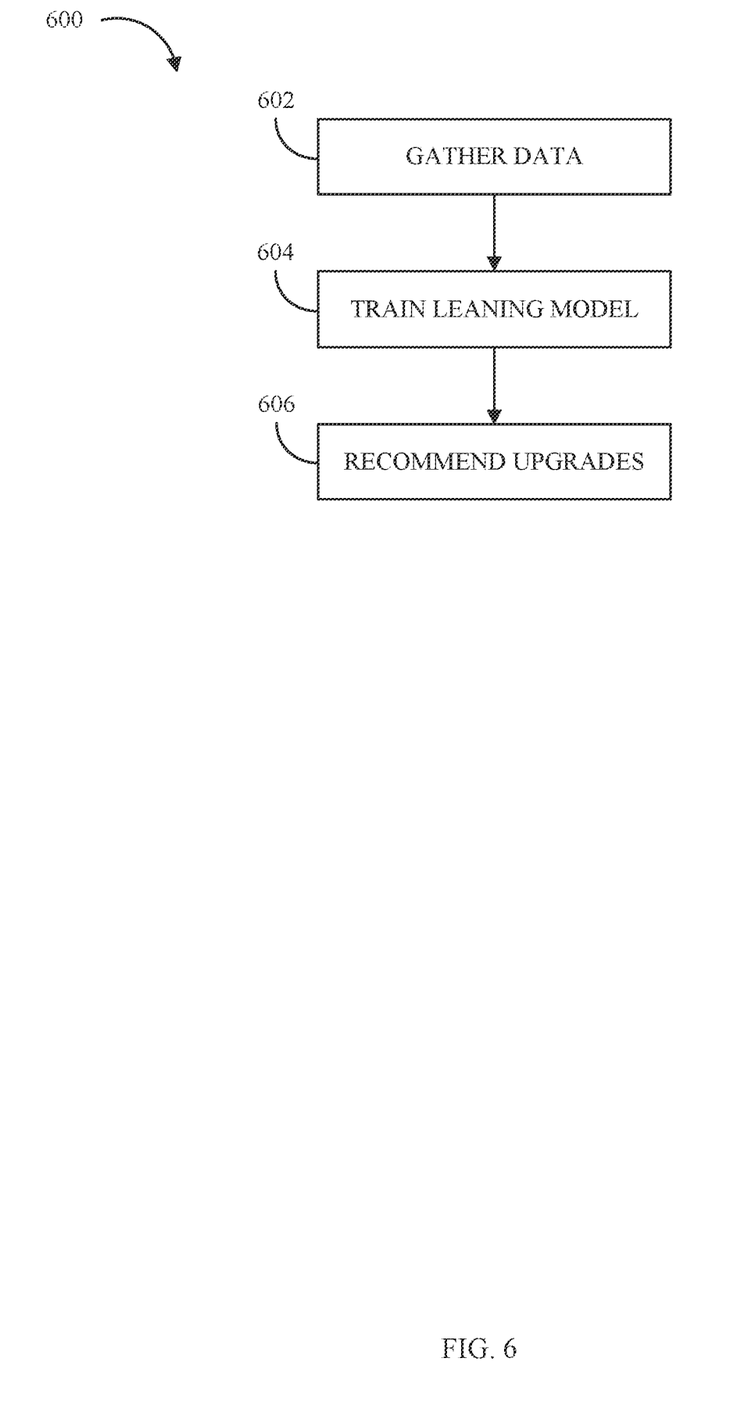
FIG. 6 illustrates a flow chart of an example method to build, train, and use a learning model.

Methods 500 and 600 can be implemented by one or more processors, host 410, network manager 412, usage predictor 414, application 416, historical data 418, edge device 420, IoT device 422, combined device 424, learning model 430, data center 440, and/or a different combination of hardware and/or software. In various embodiments, the various operations of method 500 are performed by one or more of host 410, network manager 412, usage predictor 414, application 416, historical data 418, edge device 420, IoT device 422, combined device 424, learning model 430, data center 440. For illustrative purposes, the methods 500 and 600 will be described as being performed by network manager 412.

FIG. 5 depicts a flowchart of an example method, method 500, for recommending upgrades in an edge/IoT network that can be performed in a computing environment (e.g., computing environment 400 and/or cloud computing environment 50). One or more of the advantages and improvements described above for recommending upgrades to an edge/IoT network may be realized by method 500, consistent with various embodiments of the present disclosure.

At operation 502, network manager 412 identifies each device connected to a network. In some embodiments, the network can be an edge network, and/or a IoT network. The network can be configured to perform one or more tasks. For example, the network can include a smart home, and some of the tasks can include turning on lights, opening/shutting windows, adjusting volume on a smart speaker, adjust/initiating heating and/or cooling, and other similar tasks. Another example, the network can be configured to operate in a manufacturing environment. In this example, the tasks can include automated machine route selection (e.g., overhead crane movement path and/or timing), automated machine activation/deactivation (e.g., cleaning system initiation), assembling sequencing, material handling, and other similar tasks.

In some embodiments, the network is managed by network manager 412. In some embodiments, any device connected configured to share data between at least one other device on the network can be connected to the network. In some embodiments, the network includes one or more of each of edge device 420, IoT device 422, and combined device 424. In some embodiments, each device is one of edge device 420, IoT device 422, and combined device 424.

At operation 504, network manager 412 determines the capabilities/specifications of each device in the network. In some embodiments, the specification are determined based on input data. Specification/capability data can be input by a user. In some embodiments, the specifications are determined by analyzing the device. The analysis can include sending a message to the device that request capabilities. In some embodiments, the analysis include monitoring the device during operation. The data gathered during monitoring can be analyzed to determine the relevant specifications.

In some embodiments, operation 504 includes determining how each device is used. Said differently, network manager 412 can determine what functions and/or data are provided by each device for overall operation of the system. For example, one device can provide data from a sensor, it would be determined that the device is a source of data. In some embodiments, the same function can be performed by one or more devices. For example, an edge network can have two automated cranes connected to one network. In some embodiments, the functions can be organized/categorized. The categorization can be by function. For example, for a first function, all of the devices that perform the function and/or provide data for performance can be categorized together. For example, if one edge network is configured to adjust lighting in a work area, the category can be lighting, and all lights that are brightened/darkened and/or sensor that detects current light level or need for light (e.g., user in lighted area) can be all organized into the lighting category.

The organization can allow for better analysis of how the system is being utilized and/or how efficiency can be improved. In some embodiments, each device can be placed in one or more groups/categories. Said differently, one device can utilize any number of the functions of the network.

At operation 506, network manager 412 analyzes network usage. In some embodiments, the analysis includes determining an efficiency of the network. In some embodiments, the efficiency output includes a Quality of Service (QoS) indicator. QoS can be a measurement of the overall performance of the network. Some factors considered in determining a QoS can include throughput, delay, availability, and the like. In some embodiments, network manager 412 can identify devices and/or functions that have a lower than expected, or a lower than possible QoS.

In some embodiments, operation 506 includes sending the collected data to learning model 430. In some embodiments, learning model 430 can perform all or some of the analysis. Learning model 430 can extract insights from the data based on previously analyzed data and/or training data.

In some embodiments, the analysis can identify functionality that is going unutilized (e.g., not being used). This can be for capacity and/or for actions that can be performed. Capacity can be additional throughput, additional intensity (e.g., brighter light), and the like. A function can be any function a device can perform that is not being utilized by network manager 412. For example, if a device has a red light and a blue light, and only the red light is utilized, then the network manager 412 can determine a blue light is available to use.

At operation 508, network manager 412 simulates changes to the network. The simulation can replicate completing tasks within the network. The simulations can be based on mimicking data transfer and events performed in the network. In some embodiments, network manager 412 can alter functionality of one or more devices to run a simulation. The altered functionality can include changing specifications to one or more devices and/or enable or use an unused capability of the device. The altered functionality can be to add one or more devices to the network. In some embodiments, the simulations are processed through learning model 430.

In some embodiments, the simulation can include potential new and/or upgraded devices. The potential new device specification can be obtained from a user. For example, a user can input specification for a device to be run through the simulation. In some embodiments, the potential new device specification can be obtained from publicly available information (e.g., marketing materials, website, advertisement, etc.). The specifications can be obtained by natural language processing (NLP).

At operation 510, network manager 412 recommends one or more upgrades to the network. In some embodiments, the recommendations can include upgrading the network type. The upgrade can include changing a network from an IoT network to an edge network. This may or may not require a new device in the network. In some embodiments, the recommendation can include changing a mode of operation of a device. The recommendation can include any change to the network configured to increase the efficiency of the network. The increase in efficiency can be targeted to one portion/function of the network.

In some embodiments, the recommendation can include to add/remove one or more devices to the network. In some embodiments, the addition can be a potential new device. In some embodiments, the recommendation can be to exchange a device for a different device.

In some embodiments, the recommendations are generated by usage predictor 414 and/or learning model 430. The recommendations can be based on the output of learning model 430. The output can be based on analyzing efficiency changes in the network based on one or both of actual changes and the simulated changes. Data from a separate network can be used as training data. In some embodiments, the recommendations can be preemptive. Said differently, the learning model can predict that usage of the network will increase in the future. This can be based on analyzing historical trends, and upgrade patterns, release of new products and/or other similar factors. For example, network manager 412 can determine that a network has consistently grown by about 5% a year. One recommendation can be based on increasing overall capacity prior to capacity becoming a limiting factor.

At operation 512, network manager 412 implements the recommendations. In some embodiments, the implementation is in response to a user accepting the recommendation and/or installing any new/upgraded devices. In some embodiments, the recommendations for configuration settings can be automatically implemented.

FIG. 6 depicts a flowchart of an example method, method 600, for generating a recommendation for a command boundary that can be performed in a computing environment (e.g., computing environment 400 and/or cloud computing environment 50). One or more of the advantages and improvements described above for dynamic boundary creation for voice command authentication may be realized by method 500, consistent with various embodiments of the present disclosure.

At operation 602, network manager 412 gathers data. In some embodiments, the data is based on the monitoring of the network, simulation data, and/or new product information. In some embodiments, the data is gathered consistent with operations 504-508 of method 500.

At operation 604, device manager 412 trains learning model 416. In some embodiments, learning model 416 can be trained to recommend one or more command boundaries. In some embodiments, learning model 416 can be trained to classify commands. In some embodiments, learning model 416 can be trained to recommend a new/update to the command categories (e.g., adding a new category, removing an existing category, moving a command between categories, etc.). In some embodiments, learning model 416 can be trained to recommend a time frame for a command boundary to be active. The recommendation can be for a trigger, a time, and/or a number of uses.

At operation 606, device manager 412 recommends one or more upgrades to a network. In some embodiments, operation 606 can be consistent with operation 510 of method 500.

Computer Technology and Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
identifying, in a network, a plurality of devices, wherein each device in the network is configured to provide data to at least one other device in the network;
determining capabilities of each device of the plurality of devices;
monitoring, for each device, capacity information and tasks performed during operation of the network;
analyzing, based on the monitoring, each use of each device, wherein the analyzing is configured to generate a Quality of Service (QoS) score for each device and an overall QoS score for the network, and wherein the QoS score for each device represents an effectiveness for each device;
recommending, in response to the analyzing and by a learning model, a first upgrade to the network, wherein the first upgrade is configured to increase an efficiency of the network; and
implementing the first upgrade, wherein the implementing includes adding a new device to the network.

2. The method of claim 1, wherein the first upgrade is configured to increase a first QoS score for a first device of the plurality of devices.

3. The method of claim 1, wherein the analyzing is performed by the learning model trained by a set of historical data based on the monitoring of each device.

4. The method of claim 1, wherein the first upgrade includes upgrading a capacity of the network, and the recommending is based on the learning model predicting an increase in demand on the network.

5. The method of claim 3, wherein the analyzing includes performing one or more simulations of the networks, and the training data is further based on results of the one or more simulations.

6. The method of claim 5, wherein the one or more simulations include a digital twin for each device of the plurality of devices and an additional simulated device, wherein at least one setting on a first device is altered for the simulation.

7. The method of claim 1, wherein the first upgrade includes adding a newly available product to the plurality of devices.

8. The method of claim 1, wherein the first upgrade includes initiating an unused function on a second device of the plurality of devices.

9. The method of claim 1, wherein the network is an Internet of Things (IoT) network, and the first upgrade includes changing the network to an edge network.

10. The method of claim 9, wherein changing the network to the edge network includes adding an edge device to the plurality of devices.

11. A system comprising:
a processor; and
a computer-readable storage medium communicatively coupled to the processor and storing program instructions which, when executed by the processor, are configured to cause the processor to:
identify, in a network, a plurality of devices, wherein each device in the network is configured to provide data on at least one other device in the network;
determine capabilities of each device of the plurality of devices;
monitor, for each device, capacity information and tasks performed during operation of the network;
analyze, based on the monitoring, each use of each device, wherein the analysis is configured to generate a Quality of Service (QoS) score for each device and an overall QoS score for the network, and wherein the QoS score for each device represents an effectiveness for each device;
recommend, in response to the analysis and by a learning model, a first upgrade to the network, wherein the first upgrade is configured to increase an efficiency of the network; and
implement the first upgrade, wherein the implementing includes adding a new device to the network.

12. The system of claim 11, wherein the analysis in performed by the learning model trained by a set of historical data based on the monitoring of each device.

13. The system of claim 12, wherein the first upgrade can include upgrading a capacity of the network, and the recommendation is based on the learning model predicting an increase in demand on the network.

14. The system of claim 12, wherein the analyzing includes performing one or more simulations of the networks, and the training data is further based on results of the one or simulations.

15. The system of claim 13, wherein each of the one or more simulations includes generating a Quality of Service (QoS) score for each device in each simulation.

16. A computer program product, the computer program product comprising a computer readable storage medium having program instructions embodied therewith, the program instructions executable by a processing unit to cause the processing unit to:
identify, in a network, a plurality of devices, wherein each device in the network is configured to provide data on at least one other device in the network;
determine capabilities of each device of the plurality of devices;
monitor, for each device, capacity information and tasks performed during operation of the network;
analyze, based on the monitoring, each use of each device, wherein the analysis is configured to generate a Quality of Service (QoS) score for each device and an overall QoS score for the network, and wherein the QoS score for each device represents an effectiveness for each device;
recommend, in response to the analysis and by a learning model, a first upgrade to the network, wherein the first upgrade is configured to increase an efficiency of the network; and
implement the first upgrade, wherein the implementing includes adding a new device to the network.

17. The computer program product of claim 16, wherein the plurality of devices includes a first device that is an Internet of Things device, a second device that is an edge computing device, and a third device that is a combined device, wherein the combined device includes an Internet of things device and an edge device in one device.

18. The computer program product of claim 17, wherein the first upgrade includes replacing the first device with a new device, wherein the new device is a second combined device.

19. The computer program product of claim 17, wherein the first upgrade includes replacing the first device and the second device with a second new device, wherein the second new device is a third combined device.

* * * * *